Patented Nov. 18, 1941

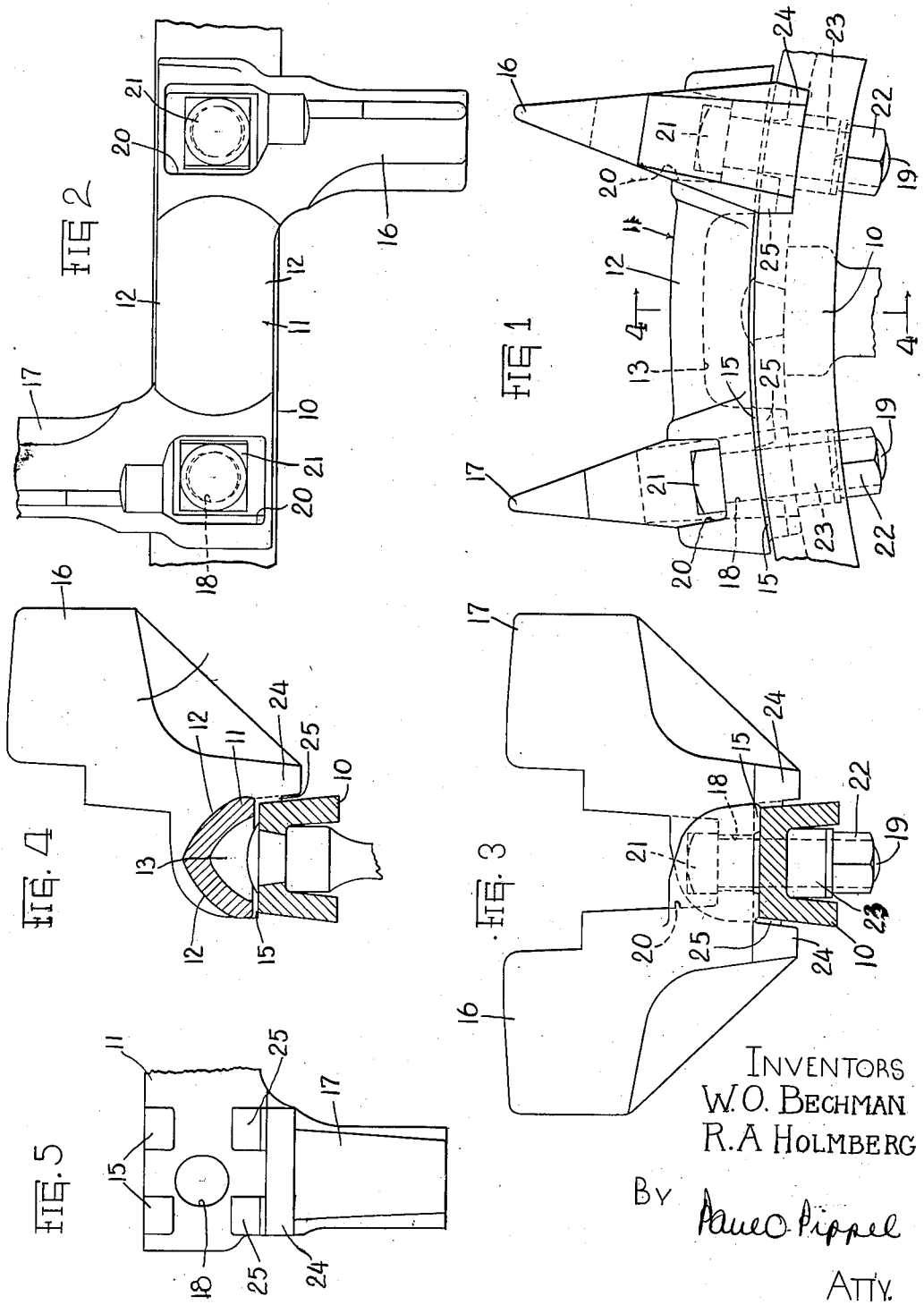

2,262,878

UNITED STATES PATENT OFFICE 2,262,878

TRACTION ELEMENT

William O. Bechman and Rudolph A. Holmberg, Chicago, Ill., assignors to International Harvester Company, a corporation of New Jersey Application April 12, 1940, Serial No. 329,322

6 Claims. (Cl. 301—44)

This invention relates to a traction element, and more particularly to a wheel lug of the double or "Siamese" type.

The invention contemplates and has for its principal object the provision of a double lug for a wheel having a narrow-width rim, wherein a traction element is formed with a body portion adapted to be secured to the wheel rim and having a pair of integral lugs formed thereon adapted to extend respectively at opposite sides of the rim.

An important object is to provide an improved lug of the type referred to, which is simple and easy to manufacture and which incorporates provisions adapting the lug for efficient use. A complete understanding of these and other objects of the invention will be had from the following detailed description taken in conjunction with the accompanying sheet of drawings, in which:

Figure 1 is a side view of the improved lug as attached to the rim of a wheel;

Figure 2 is a plan view of the same;

Figure 3 is an end view of the same;

Figure 4 is a transverse sectional view taken on the line 4—4 of Figure 1; and,

Figure 5 is a bottom view of one end portion of the lug, showing the mounting pads.

Only a portion of a wheel of a generally conventional type has been illustrated in the drawing at 10. The rim is of the narrow-width type, having a rim preferably formed as a channel, as shown. Only that portion of the wheel is shown as is necessary to illustrate the improved lug forming the subject matter of the invention. As best shown in Figure 2, the lug comprises a body portion 11 of narrow width, generally conforming to the width of the rim of the wheel 10. This body portion is generally semicylindrical in cross-section, as best shown in Figure 4, having outwardly tapering outer surfaces 12. These surfaces are adapted to be disposed outwardly when the lug is secured to the wheel. The body portion is preferably cut out or formed hollow, as at 13. Each end of the body portion, at the under surface thereof, is provided with a plurality of mounting pads 15 adapted to engage the outer peripheral surface of the rim of the wheel 10. The provision of the pads 15 space the remainder of the under surface of the body portion 11 from the periphery of the rim.

The body portion is provided at one end thereof with a traction lug 16 preferably formed integral therewith. The lug 16, as shown in Figures 2 and 3, extends laterally at one face of the wheel and is tapered radially outwardly to provide a ground-penetrating point. The opposite end of the body is provided with a similar lug 17 extending at the other face of the wheel. The lugs are thus adapted to overhang the sides of the wheel, and are thus generally more effective in providing traction than lugs mounted directly in the plane of the wheel rim, since the overall effective width of the rim is increased by the overhanging lugs.

The body portion is provided with a pair of openings 18 spaced circumferentially as respects the wheel. These openings 18 are respectively in alinement with the lugs 16 and 17; that is to say, a plane passing through the axis of one opening 18 passes also through the center line of the proximate lug. The openings 18 are adapted to receive bolts 19 for securing the element to the wheel 10. Each opening is substantially surrounded by walls provided by the body portion by means of a recess 20 being formed therein. The bolt includes a head 21 which is accommodated by the recess. The bolt includes also a nut 22 threaded thereon in the usual manner for securing the element to the wheel. Each bolt further includes a spacer 23 adapted to fill in the space between the side walls of the channel forming the wheel rim. This arrangement is best shown in Figure 3.

As previously mentioned, each end of the body is provided with a plurality of mounting pads 15. As seen in Figure 5, these pads are located in proximity to the respective bolt-receiving opening 18. Thus, when the element is secured to the wheel, the pads 15 provide finished surfaces which adapt the lugs or elements to rest rigidly and securely on the wheel rim. In addition to the mounting pads 15, the body includes a second set of mounting pads. These pads are provided by a downwardly extending integral portion of a lug 16 or 17. This portion, as generally indicated at 24 in Figure 4, includes a pair of spaced mounting pads 25 at the inner side thereof. This is also shown in Figure 5. These pads are adapted to engage the respective side wall of the wheel rim. The cooperation between the sets of mounting pads 15 and 25 provides for additional rigidity between the wheel and the traction element.

As best shown in Figure 3, the lugs 16 and 17, in addition to being spaced circumferentially as respects the wheel rim, are also spaced laterally, so that each lug extends upwardly and outwardly from the body 11 at a point adjacent the respective side of the body. There is thus provided a considerable space between the lugs which contributes to the properties of the lug as being selfcleaning. The tapering surfaces 12 formed on the body 11 also contribute to the ability of the lug to keep itself free from soil. The recessing of the bolt heads 21 on the bolts 19 eliminates projecting bolt heads which are apt to accumulate packed soil. Furthermore, the bolt heads have little contact with the ground, and consequently do not become so readily worn. Certain other features of the improved traction element will be apparent to those skilled in the art.

From the foregoing description it will be seen that an improved traction element has been provided for accomplishing the objects and purposes set forth. It will be appreciated, of course, that only a preferred embodiment of the invention has been illustrated and described and that numerous modifications and alterations may be made therein without departing from the spirit and scope of the invention as defined in the appended claims.

What is claimed is:

1. A traction element for a traction wheel having a narrow-width rim, comprising a body of narrow width adapted to be disposed at the periphery of the rim, said body being generally semicylindical and having an under surface provided with a pair of spaced mounting pads adapted to engage the rim, said pads being spaced circumferentially as respects the wheel, the curved surface of the body being adapted to face outwardly from the wheel, a pair of lugs formed integral with the body and spaced circumferentially as respects the wheel, said lugs being alined respectively with the mounting pads, one lug extending at one side of the body at one end thereof and the other lug extending at the other side of the body at the other end thereof, said lugs being thereby adapted respectively to overhang the opposite sides of the wheel rim, said body being formed with a pair of spaced openings alined respectively with the lugs and extending through the body generally along radii of the wheel and adapted to receive bolts for securing the element to the wheel, the body being recessed at its outer side at each opening to accommodate the heads of the securing bolts.

2. A traction element for a traction wheel having a narrow-width rim, comprising a body of narrow width adapted to be disposed at the periphery of the rim, said body having an outwardly tapering outer surface and an under surface adapted to engage the rim, the tapering surface of the body being adapted to face outwardly from the wheel, a pair of lugs formed integral with the body and spaced circumferentially as respects the wheel, one lug extending at one side of the body at one end thereof and the other lug extending at the other side of the body at the other end thereof, said lugs being thereby adapted respectively to overhang the opposite sides of the wheel rim, said body being formed with a pair of spaced openings alined respectively with the lugs and extending through the body generally along radii of the wheel and adapted to receive bolts for securing the element to the wheel, the body being recessed at its outer side at each opening to accommodate the heads of the securing bolts.

3. A traction element for a traction wheel having a narrow-width rim, comprising a body of narrow width adapted to be disposed at the periphery of the rim, said body having an under surface provided with a pair of spaced mounting pads adapted to engage the rim at its periphery, said pads being spaced circumferentially as respects the wheel, a pair of lugs formed integral with the body and spaced circumferentially as respects the wheel and each including a portion engaging a side of the rim, said lugs being alined respectively with the mounting pads, one lug extending at one side of the body at one end thereof and the other lug extending at the other side of the body at the other end thereof, said lugs being thereby adapted respectively to overhang the opposite sides of the wheel rim, said body being formed with a pair of spaced openings alined respectively with the lugs and extending through the body generally along radii of the wheel and adapted to receive bolts for securing the element to the wheel, the body being recessed at its outer side at each opening to accommodate the heads of the securing bolts.

4. A traction element for a traction wheel having a narrow-width rim, comprising a body of narrow width adapted to be disposed at the periphery of the rim, said body having an outwardly tapering outer surface and an under surface provided with a pair of spaced mounting pads adapted to engage the rim periphery, said pads being spaced circumferentially as respects the wheel and the body portion between the pads being thereby adapted to be spaced from the rim periphery, the tapering surface of the body being adapted to face outwardly from the wheel, a pair of lugs formed integrally with the body and spaced circumferentially as respects the wheel, said lugs being alined respectively with the mounting pads, one lug extending at one side of the body at one end thereof and the other lug extending at the other side of the body at the other end thereof, said lug being thereby adapted respectively to overhang the opposite sides of the wheel rim, said body being formed with a pair of spaced openings alined respectively with the lugs and extending through the body generally along radii of the wheel and adapted to receive bolts for securing the element to the wheel, the body being recessed at its outer side at each opening to accommodate the heads of the securing bolts.

5. A traction element for a traction wheel having a narrow-width rim, comprising a body of narrow width adapted to be disposed at the periphery of the rim, said body having an outwardly tapering outer surface and an under surface adapted to engage the rim, the tapering surface of the body being adapted to face outwardly from the wheel, a pair of lugs formed integral with the body and spaced circumferentially as respects the wheel, one lug extending at one side of the body at one end thereof and the other lug extending at the other side of the body at the other end thereof, said lugs being thereby adapted respectively to overhang the opposite sides of the wheel rim, each lug extending radially inwardly as respects the wheel and including an integral pad engaging the respective side of the rim, said body being formed with a pair of spaced openings alined respectively with the lugs and extending through the body generally along the radii of the wheel and adapted to receive bolts for securing the element to the wheel.

6. A traction element for a traction wheel having a narrow-width rim, comprising a body of narrow width adapted to be disposed at the periphery of the rim, said body having an under surface provided with spaced mounting pads adapted to engage the rim, said pads being spaced circumferentially as respects the wheel, a pair of lugs formed integral with the body and spaced circumferentially as respects the wheel and alined respectively with the mounting pads, one lug extending at one side of the body at one end thereof and the other lug extending at the other side of the body at the other end thereof, said lugs being thereby adapted respectively to overhang the opposite sides of the wheel rim, each lug extending radially inwardly as respects the wheel and including an integral pad engaging the respective side of the rim, said pads being respectively alined with the first named pads, said body being formed with a pair of spaced openings alined respectively with the lugs and extending through the body generally along radii of the wheel and adapted to receive bolts for securing the element to the wheel.

WILLIAM O. BECHMAN.
RUDOLPH A. HOLMBERG.